Nov. 8, 1932.　　　A. F. SPITZGLASS　　　1,886,844
BOILER METER RECORDER
Filed Jan. 10, 1929　　　4 Sheets-Sheet 1

Inventor:
Albert F. Spitzglass,
per James B. Lewis
Attorney.

Nov. 8, 1932.  A. F. SPITZGLASS  1,886,844
BOILER METER RECORDER
Filed Jan. 10, 1929  4 Sheets-Sheet 2

Fig. 4

Inventor:
Albert F. Spitzglass.
per James B Lewis
Attorney.

Inventor:
Albert F. Spitzglass.
per James B. Lewis
Attorney.

Nov. 8, 1932.          A. F. SPITZGLASS          1,886,844
                        BOILER METER RECORDER
                  Filed Jan. 10, 1929     4 Sheets-Sheet 4

Inventor:
Albert F. Spitzglass.
per James B. Lewis
Attorney.

Patented Nov. 8, 1932

1,886,844

UNITED STATES PATENT OFFICE

ALBERT F. SPITZGLASS, OF CHICAGO, ILLINOIS, ASSIGNOR TO REPUBLIC FLOW METERS COMPANY, OF CHICAGO, ILLINOIS, A CORPORATION OF ILLINOIS

BOILER METER RECORDER

Application filed January 10, 1929. Serial No. 331,468.

The present invention relates to recording instruments, and more particularly to the multiple pen recording type, in which a plurality of instruments are arranged to record fluctuations or variations of forces by styluses on a moving sheet or chart in the form of more or less irregular lines, so that by using a chart divided and ruled according to a predetermined standard visible records are obtained showing exactly the character and extent of such fluctuations.

The general object of the present invention is to provide an improved multiple pen recorder.

An object of the invention is to provide a recorder with the recording units mounted in banks or rows and one bank behind the other with the pens of the back row turning about the same axis as the corresponding pen of the front row.

Another object is to provide a casing for a recorder, adapted to be mounted on an instrument panel or support with the front thereof substantially flush with the front of the panel.

Still another object is to provide an improved guard or guide for the chart.

Yet another object is to provide a pen lifter for the several pens which in raised position holds the pens away from the chart and in lower position presses the chart into engagement with the feed drum and backing plate.

A further object is to provide a longitudinally adjustable feed roll.

Still further object is to provide a new and improved feed roll or drum and driving connection therefor.

Yet further object is to provide a new and improved chart roll support.

An additional object is to provide a chart roll support which may be moved forward to an accessible position whereby the roll may be easily inspected or renewed.

With these and other objects in view, the invention consists in the construction and novel combination and arrangement of parts hereinafter fully described, illustrated in the accompanying drawings and pointed out in the claims hereto appended, it being understood that various changes in the form, proportion and details of construction, within the scope of the claims, may be resorted to without departing from the spirit or sacrificing any of the advantages of the invention.

In the drawings, wherein like reference characters designate like parts throughout the several views—

Referring more specifically to the exemplary embodiment of the invention illustrated in the drawings, the numeral 1 designates a panel board or mounting for the recorder, which panel has a portion thereof, adjacent its longitudinal edges, bent at right angles to the plane of the face of the board to provide strengthening flanges 2, which flanges also form a protected area therebetween for the instruments mounted on said panel. The panel has an opening 3 provided therein for the reception of a portion of the recorder casing which casing is adapted to carry the recording mechanism, the structure of which will be hereinafter described.

The recorder casing essentially consists of a bezel portion 5 of such width as to subtend the opening 3 and lie against the front face of the panel and a wall portion 4 projecting backwardly therefrom with a part thereof passing through the opening in the panel. Bezel 5 is adapted to be rigidly secured to the panel by securing means, such as bolts 6, and when so secured thereto forms a substantially flush front assembly with the front of the panel. Hingedly connected to the front of the bezel is a door 7 for closing the front of the recorder casing and this door is provided with a window 8 closed by a transparent medium such as a glass 9 which permits inspection of the recorder mechanism and the records made thereby on the chart. To provide a dust-proof fit between the door 7 and bezel 5 a gasket, such as felt, is inserted therebetween and is preferably secured to the door, as with glue or other adhesive to prevent displacement thereof when the door is opened. The bottom portion of the door is preferably cut away as at 11 to provide a space for the free passage of the chart as it passes from the recorder casing. Guide 12, into which the chart enters after leaving the recorder casing, is hinged, at its bottom, to the panel and is adapted, when closed, to have the top 13 thereof abut against the bottom of the door 7, as shown in Figure 4.

The top edge 14 of the guide is adapted to serve as a severing edge against which the chart may be drawn in tearing off portions thereof and the guide is provided with a transparent window 15 through which the chart may be observed. While the guide shown is of sufficient length to cover a twenty-four hour length of the chart it could be made longer or shorter, to house a greater or lesser length of chart record, as the exigencies of the particular installation may demand. The bottom edge of the guide adjacent the panel is cut away, similar to the recorder door, to provide a passage for the free egress of the chart and is formed with a knife edge against which the chart may be drawn in tearing off portions thereof. Both the door 7 and guide 12 are provided with furcated lugs 16, as clearly shown in Figures 2 and 3, for the reception of knurled knobs 17 screwed into threaded balls retained on the bezel and panel, respectively, all of which forms a convenient means for holding the door and guide in closed position. The knobs may be easily unscrewed and swung to one side to permit opening of said door and guide. A gasket, such as felt, is inserted between the face of the guide which abuts against the panel and the door 7 to secure a dust and moisture proof connection therebetween and while the felt may be fastened by any suitable means either to the panel or guide it has been found convenient to glue it to the guide. In order to prevent the guide from falling forward, when opened, links 18 are interconnected to the panel and guide to limit opening of the latter. These links fold together, when the guide is closed, and are covered by the guide when it is in such closed position.

Figure 1:
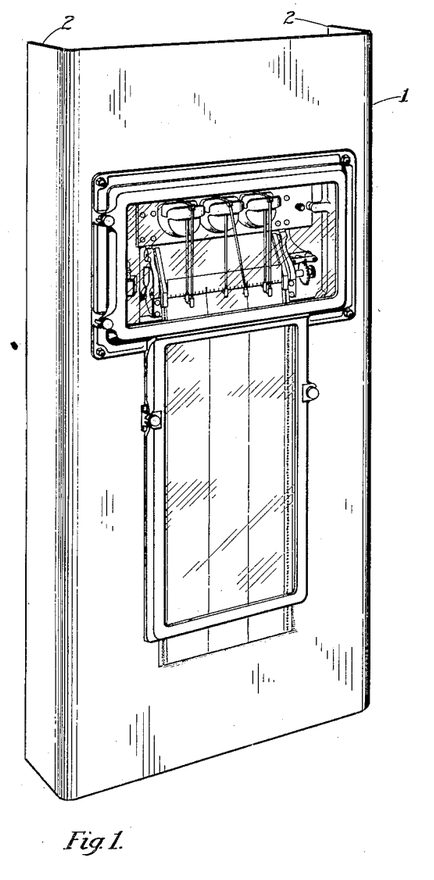
Figure 1 is a perspective view of the recorder and panel assembly.
Figure 2:
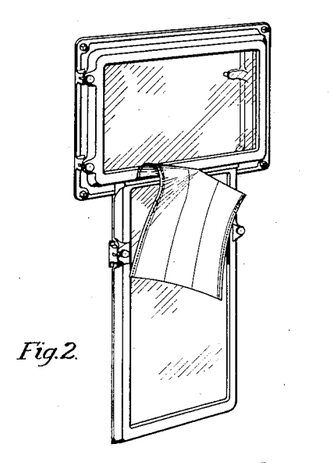
Figure 2 is a perspective view of the recorder door and chart guide illustrating one method of tearing off the chart.
Figure 3:
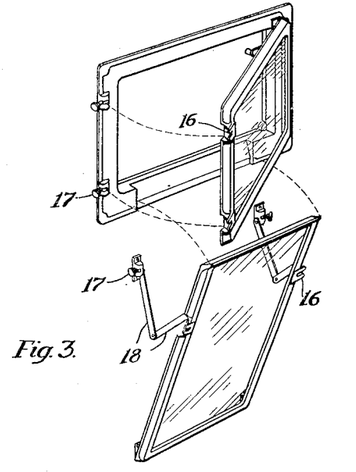
Figure 3 is a perspective view of the recorder door and chart guide in partial open position.

When it is desired to tear off the portion of the record strip below the recorder door 7 the knurled knobs 17 at either side of the guide 12 are unscrewed sufficiently to swing free of the lugs 16 to permit opening of the guide, then the portion of the strip is brought out over the top of the guide, as shown in Figure 2, which guide is then closed. The portion of the strip is grasped and pulled downwardly and laterally to bring it against the edge 14, of the guide, whereby the strip is torn along its line of contact with said edge, the door is then slightly opened to permit the then end of the strip, which was held between the guide and bottom of door 7, during the tearing operation, to fall back into place beneath the guide. The guide is then closed and locked in such position by swinging the knobs 17 back into position, between the furcations of lugs 16, and screwing them down tightly. To tear off the portion of the strip below the bottom of the guide said portion is grasped and pulled upwardly and laterally to bring it against the bottom edge of the guide whereby the strip is torn along its line of contact with the edge of the guide. The guide 12 thus forms a simple, convenient and practical means for severing portions of the record strip whenever it may be desirable to remove such portions for filing or examination. There is thus provided a selective tear-off device for severing the record sheet at either of two points and which does not interfere with the inspection of the record. Another advantage of the guide is that the transparent front thereof not only permits uninterrupted inspection of the record strip over a period of say one day's operation but it also prevents the accumulation thereon of dust, soot and other foreign matter floating around in the ambient atmosphere and it further keeps the strip from curling up thereby presenting a clean flat, readable surface exposed to view, which obviously facilitates examination thereof.

Figure 4:
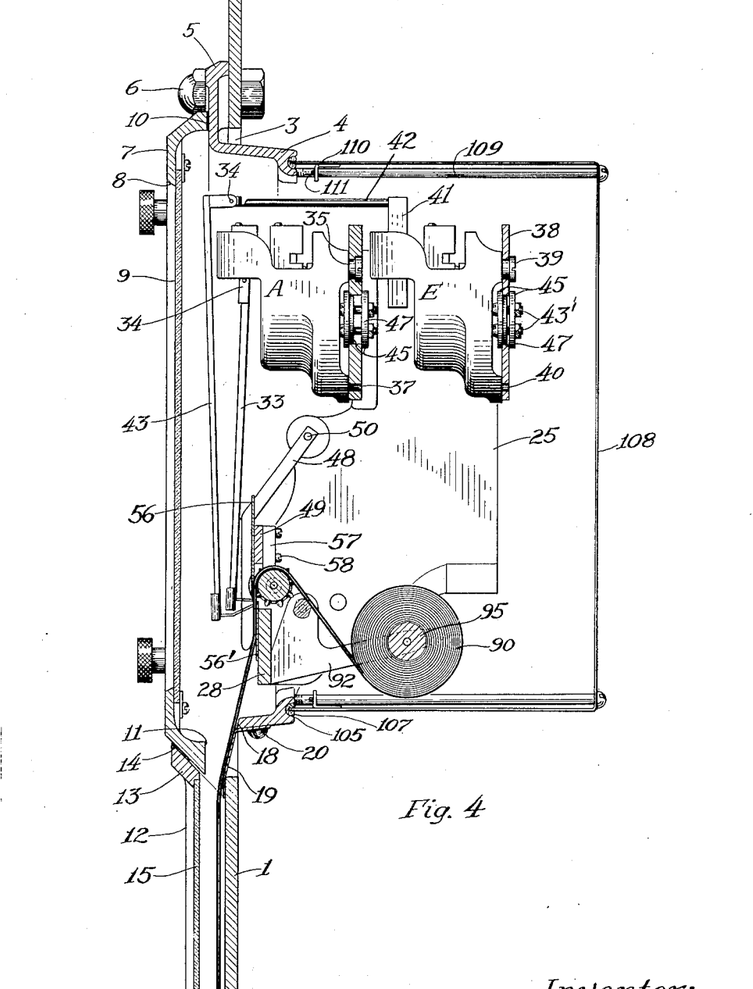
Figure 4 represents a vertical sectional view through the recorder and adjacent sections of the panel and chart guide.

Referring to Figure 4, it will be seen that the portion of the recorder casing adjacent the path of the record strip is cut away at 18 to permit a substantially vertical drop of the record strip from the feed roll to the guide. This is an important feature since it dispenses with the bending of the strip as it moves away from the feed roll and it also causes the strip to travel in a path parallel to and in close proximity to the panel board and away from the glass window 15 of the guide. In this arrangement the front surface of the strip does not come in contact with any object after it leaves the recorder stylus thus allowing the ink to dry without smearing, which would inevitably occur should the strip rub against any object before the ink has time to dry, and a clean clear cut record is thus preserved. A metal strip 19, secured to casing 4 as by means of screws 20, serves to close the opening in the casing and to direct the strip into the guide 12.

Figure 5:
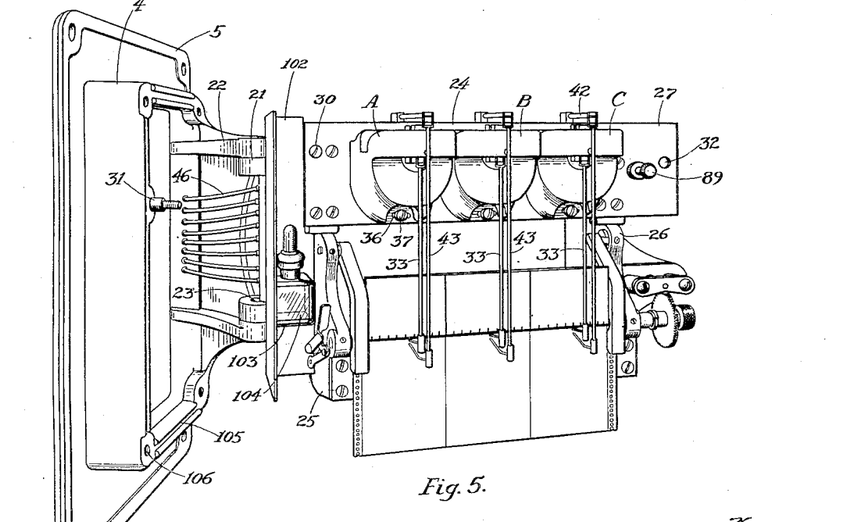
Figure 5 represents a perspective back view of the recorder casing with the back swung to open position.
Figure 8:
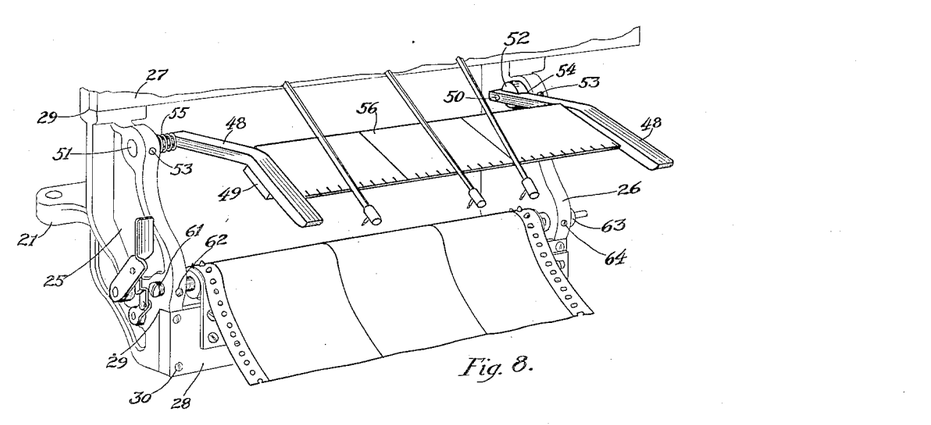
Figure 8 is a view showing the pen lifter in raised position.

Referring now to Figure 5, the wall 4 of the recorder casing, is provided with lugs to which is hinge-connected the mechanism mounting frame 24. As shown, the hinge connections comprise hinge lugs 21, carried at one end of the mounting frame 24, hinge lugs 22 formed on the wall 4, of the recorder casing, and connecting hinge pintles 23. The mechanism mounting frame 24 consists of end castings 25 and 26 connected together by the mounting plate 27 and the end tie-member 28. As shown in Figure 8 the end castings 25 and 26 are counter-sunk at 29 for the reception of the mounting plate 27 and tie member 28 and said plate and member are secured to said castings as by screws 30. While the construction just described lends itself readily to manufacture and assembly it is to be understood that the plate and member may be secured to the end castings 25 and 26 by any suitable means, known to the trade, other than by screws as illustrated. The frame assembly illustrated forms a rigid structure which is adapted by reason of the hinge connections to swing back and forth similar to a door. In the normal operating condition of the apparatus, the frame 24 is preferably rigidly held in place, as by means of the spacer bolt 31 passing through opening 32 in plate 27 and having a nut, not shown, screwed thereon against the back of said plate.

On the mounting plate 27 are mounted the motor units A. B. C., here shown as three in number, and constituting the front bank or row of units. Each of these units is provided with a pen or stylus 33 extending to the required position on the chart to make a mark thereon as it passes by said pen. These pens are pivotally connected to their respective operating shafts, as clearly shown at 34, in Figure 4, so that they can be swung away from the chart for a purpose to be hereinafter described.

The transverse pivots 34 of the pens are so placed with respect to the plane of the strip chart that the center of gravity of the pens lies slightly out of the vertical line passing through the pivot 34 so that there is a small pressure due to gravity of the pens against the chart. A plate 56', carried by member 28, is placed behind the chart to serve as a backing member for the chart and against which the pens press the chart.

Each of the units is connected to the plate 27 by means of a shoulder screw 35 which passes thru an opening in said plate and the arrangement is such that the axis of the screw is in alignment with the axis of the pen operating shaft so that when the unit is turned about this axis the position of the pen relative to the chart will be adjusted. This is a very desirable feature of the apparatus as it provides for the ready and convenient adjustment of the pen to the zero, or other position, without the necessity of changing the position of the pen relative to its operating shaft. To allow for this adjustment and to retain the unit in adjusted position an elongated arcuate slot 36 is provided in the base of the unit and a screw 37 passed therethrough and into the plate 27. Adjustment is secured by loosening the screw 37, turning the unit about screw 35 until the proper adjustment has been made and tightening screw 37 to retain the unit in its then adjusted position.

The end casting 25 is provided, preferably at its rear edge, for the reception of one end of a second mounting plate 38, which is spaced away from the front plate 27, to provide sufficient space therebetween to accommodate another set of units, E. F. G., one of which is clearly shown in Figure 4. The other end of plate 38 is conveniently supported by posts, not shown, interposed between said plates or between the back plate and end casting 26. The units of the back row are structurally the same as the units of the front row and are mounted on plate 38, by means of a screw 39, the axis of which is in alignment with the axis of the pen operating shaft of that unit and also in alignment with the axis of screw 35 and the pen operating shaft of the front unit. To provide for adjustment of the rear unit a screw 40, similar to screw 37, is provided which operates in a slot, not shown, in the unit E. In order to carry the motion of the back row of units forward to the pens there is provided a lever 41 secured to the pen operating shaft of each unit and to which is secured an arm 42 projecting forward a sufficient distance to support the pen 43, free of the front unit and its pen 33. The pens of the back row, as illustrated in Figure 4, overhang the corresponding pens of the front unit and are slightly longer than those of the front row so that the front and back pens working on the same chart section can pass without interfering with each other. In order to distinguish the records of the front and back units different colored ink is used.

Where three pens or a multiple thereof are used the chart is preferably divided into three paths and a pen or group of pens mark only on one path, for example in the six pen recorder illustrated in Figure 5 a pen of the front row and a pen of the back row operate over one of the paths while corresponding pairs of pens of the front and back rows operate over each of the other two paths, thus there are three separate paths and no crossing of inks. Where more than one pen operates over a single path records are chosen which are not liable to cross, for example, different temperatures along a boiler, all of which are greater than the one preceding. When this is done as many as six or nine records can be made on a single chart without the terrible confusion that that number would ordinarily give.

Back plate 38 is adapted to have mounted thereon another plate upon which a third row of motor units may be mounted and the pens thereof are supported similarly to those of the back row above described. Thus the six pen recorder illustrated can be readily converted into a triple or nine pen recorder by the addition thereto of another bank of motor units.

In the illustrated construction the motor units A. B. C. E. F. G. may be and are shown similar to one another although they need not be and each unit comprises generally a current coil and a control coil, both of which are mounted in the unit casting or housing, and a laminated core mounted so as to be moved by the passage of current through the current coil. The core is conveniently connected to the pen operating shaft so that the movement thereof will be transmitted to the pen to cause movement thereof over the chart. Each of the motor units is conveniently provided with binding posts 43' carried by a disc 44, preferably of bakelite or other insulating material, rabbeted to fit an opening 45 in the mounting plate. The leads for the motor units advantageously comprise flexible portions 46 which extend from the recorder casing to the adjacent portion of the frame 24 then preferably along the back of the mounting plate to the discs 47, preferably of bakelite, which are bored for the reception of the binding posts 43'. The terminals of the proper leads are secured to the disc so that when the discs are placed over the binding posts the leads will be correctly connected to the units. This not only insures connecting the units in the proper circuits but provides for a convenient installation which is very desirable. Further detailed construction of the motor units need not be more specifically described herein because they will form the subject matter of separate applications for patent.

While the motor units illustrated are similarly constructed it is to be understood that other types of units may be substituted for those shown, for example, a flow, a temperature, a carbon dioxide, or a pressure unit or in fact any kind of measuring unit, or any combination thereof, can be substituted for any or all of those shown.

As illustrated in Figure 8, the pen lifter consists of end pieces 48 and a connecting member 49 rigidly secured to said pieces to form therewith a sturdy construction. The overall length of the pen lifter is such that it will be freely received between the end castings 25 and 26. End pieces 48 are each provided with an opening 50 for the reception of a bearing pin 51, 52 carried by castings 25 and 26, respectively, and the bearing pins are retained in position in the castings by screws 53. By loosening the screws 53 the bearings and pen lifter can be readily removed and/or replaced. One of the bearings, here shown as 52, is preferably provided with a slot 54 adapted to receive the adjacent edge of end piece 48, when said piece is in raised position. Interposed between the other end piece 48 and its adjacent casting is a spring 55 which yieldingly urges the pen lifter toward the bearing provided with the slot and the arrangement is such that when the pen lifter is raised, to its upper position, the spring causes the end piece to snap into the slot which retains said lifter in that position.

While the structure just described forms a very satisfactory latch mechanism it is to be understood that other forms of latch means may be utilized. One such form suggests itself, namely, an opening could be formed in the bearing or end casting adjacent thereto so that a pin carried by the end piece would snap thereinto when the pen lifter was raised to its uppermost position.

To lower the pen lifter, to its normal position, it is pressed against the spring until the end piece is free of the slot then it swings easily into the position shown in Figure 5. One object of the pen lifter is to move the pens away from the chart and retain them in that position so that a new chart roll may be inserted. It also may be necessary to retain the pens away from the chart for other purposes and the structure just described provides an expedient method of accomplishing that result.

On the pen lifter is mounted the dial plate 56 which carries the graduations and legends designating what the different units are measuring. Blocks 57, preferably secured by means of screws 58, to the back of member 49 of the pen lifter, as shown in Figure 4, serve to keep the chart in engagement with the feed roll as it passes thereover. These blocks are conveniently placed near the ends of the member so that they will contact with the chart near the longitudinal edges thereof when the pen lifter is in its lowermost position, and thereby keep the sprocket teeth of the feed roll in engagement with the perforations of the chart to insure proper advancement of the chart. The lower parts of end pieces 48, to which back member 49 is secured, are so formed that they lie in a plane substantially parallel with the plane of the face of end tie member 28, when the pen lifter is in its lower position and the ends of said pieces extend beyond the lower edge of member 49, as shown in Figure 4, to serve as guides for the chart during the time the record is being made thereon by the pens. When the pen lifter is in its lower position the lower edge of the dial plate is slightly above and to the front of the top edge of back plate 56' so that it directs the chart in front of said back plate and causes the chart to lie flat against said plate in position to receive the record from the pens. The extensions of the end pieces 48 also hold the lateral edges of the chart against the back plate during the recording operation and direct the chart downwardly into the guide after it has received the record. These are very important features since they insure a perfectly flat surface of the chart for the recording pens to operate upon and a clear accurate record is thereby assured. The pen lifter therefore has another important object to perform, that is, to hold the chart against the backing plate during the recording operation and to direct the chart, after it has received the record, into the guide.

Figures 6, 7:
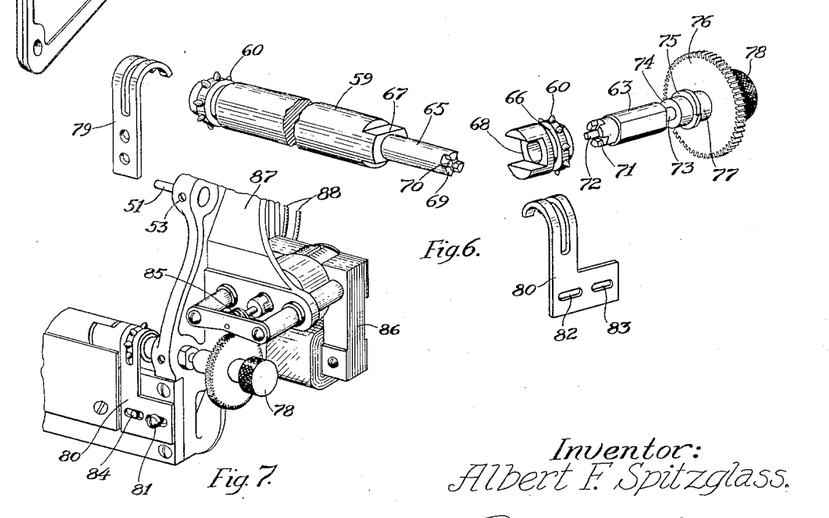
Figure 6 is a detail in perspective showing the feed roll, the guides therefor, and the friction clutch by which the worm wheel drives said roll.
Figure 7 is a perspective view of one of the end members showing the method of mounting the feed roll, the driving connection therefor and the clock.

The drum or feed roll 59, as shown in Figure 6, is advantageously provided with sprocket teeth 60 entering previously formed perforations in the record strip to insure a definite relation between the rotative movement of the feed roll and the advancement of the record strip. The ends of the roll are suitably mounted in the end castings, the end of the roll away from the driving motor therefor being supported by a pin bearing 61, more clearly shown in Figure 8, retained in end casting 25 by means of a screw 62, and the other end is supported by bearing 63 retained in end casting 26 by the set screw 64, also clearly shown in Figure 8. Ofttimes it is desirable to vary the distance between the sprocket teeth 60 to accommodate strip charts of varying widths and to accomplish this end the length of the feed roll is made adjustable by means of the following construction. The end 65 of the feed roll is of reduced diameter and fitting thereon is the sprocket 66 which may be adjusted to different positions longitudinally of the feed roll to increase or decrease, as the case may be, the distance between the sprocket teeth. To prevent relative rotary movement between the feed roll and sprocket 66 and to insure proper alignment of the sprocket teeth so that they will engage the perforations in the record strip the feed roll is provided with a tongue 67 for engagement in a groove 68 of the sprocket when the two are in assembled position and the tongue and groove are slightly off center of the longitudinal axis of the feed roll so that the sprocket can be assembled in only one position and that is the correct position. These are very important features since they provide for a variable length feed roll and insure proper positioning of the parts when the feed roll is assembled.

Another important feature which lends itself readily to ease of assembly is the coupling through which the motion is transmitted to the feed roll and which includes the following features. The end of the reduced portion 65 of the feed roll is provided with fingers 69 which interlock with similarly shaped fingers 71 on the end of the shaft 73 which is supported in bearing 63, and the end of portion 65 is also bored for the reception of a bearing pin 72 carried by the end of shaft 73. Pin 72 supports the feed roll when the roll is in assembled position and the end of shaft 73, upon which fingers 71 are formed, is slightly less in diameter than the bearing 63 so that the shaft 73 can be withdrawn through end casting 26 when the set screw 64 is loosened.

By loosening screw 64 and pulling bearing 63 out of its hole and by loosening screw 62 the drum can be removed without in any way interfering with any of the other parts of the instrument. This lends to ease in assembly and also to inspection and servicing.

Shaft 73 extends beyond bearing 63 and has an abutment such as collar 74 secured thereon and against which a friction member, shown as a lock washer 75, is adapted to press. Rotatably mounted on the shaft 73 is a worm wheel 76 which as shown is preferably provided with a hub 77 for engagement with the other side of the lock washer and the worm wheel is held tightly against the washer by the knurled knob 78 rigidly secured to the end of the shaft and which also serves as a convenient means for turning the feed roll by hand as is sometimes necessary when setting the chart for time. The exemplary mechanism just described provides a convenient, inexpensive and readily assembled friction clutch for transmitting motion to the feed roll but other forms of friction clutches may obviously be used in lieu thereof. Normally the motion of the worm wheel 76 is transmitted to the feed roll by the friction between the worm wheel, lock washer and the collar and while the friction between said elements is great enough to transmit the motion it is not so great as to preclude the turning of the feed roll by hand as described above.

Figure 9:
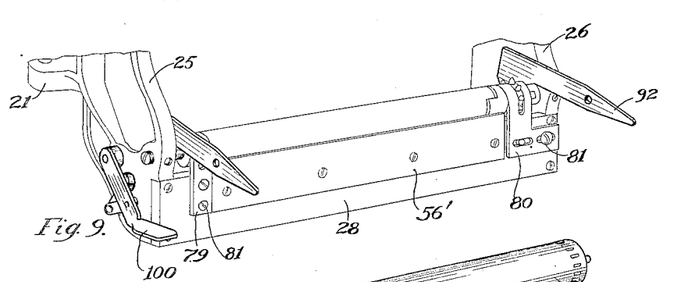
Figure 9 is a view showing the chart roll support in the forward position.

As shown in Figure 9, the feed roll 59 is retained in position by the sprocket teeth guiding elements 79 and 80, carried by the frame and preferably secured to tie member 28 by screws 81. The feed roll is of reduced diameter on each side of the sprocket teeth as shown in Figure 6, and the guide elements 79 and 80 are furcated to straddle the sprocket teeth and the furcated portions are curved on the same radius as the circumference of the feed roll so that the outer portions thereof are flush with the periphery of the feed roll to provide a smooth surface over which the record strip passes. To provide for the adjustment of the distance between the sprocket teeth the guide 80 is provided with elongated slots 82 and 83 and a pin 84 preferably carried by member 28 is adapted to be received in one of said slots, here shown as 82, and the other slot 83 receives the screw 81. By loosening the screw 81 the member 80 can be adjusted to different positions along the axis of the feed roll and this adjustment also moves the sprocket 66 thereby varying the position of said sprocket relative to the remaining portion of the feed roll and the sprocket can be maintained in adjusted position by tightening said screw 81. This adjustable feature provides a convenient means whereby the feed roll can be adapted to charts of different widths and to charts the widths of which vary because of climatic conditions in different localities.

The record sheet or chart is provided with suitably spaced openings formed adjacent the lateral edges thereof for cooperation with the sprocket teeth to insure advancement of the chart and the openings of one row are elongated to allow for lateral expansion and contraction of the chart due to changes in humidity and temperature. The adjustable feature provides a means whereby the length of the feed roll may be adjusted to a chart for a particular locality or season and the elongated slots take care of the day by day changes in the width of the chart incident to variations in humidity and temperature. These features are extremely important and have the decided advantage in that there is no strain of any kind put on the chart as it is fed over the roll.

The feed roll may be operated in any suitable manner and is preferably driven, through worm wheel 76 and worm 85, by means of a clock mechanism 86, which is shown as an electric clock, although it might be substituted by a spring driven clock, that is supported on the end casting 26. A suitable support 87 being shown as cast integral with the end casting 26 although other means may be availed of to support the clock from the casting. When the clock is electrically driven suitable current may be supplied, for driving the clock, through leads 88 which are continuations of the leads 46, hereinbefore mentioned, and a switch 89, located at a convenient place preferably on the mounting plate 27, is provided for making and breaking the current to the clock. Since the structural details of the clock form no part of the present invention and since many forms of such clocks are known in the art it is deemed unnecessary to further show or describe the structural details and the mode of operation thereof.

Figures 10, 11:
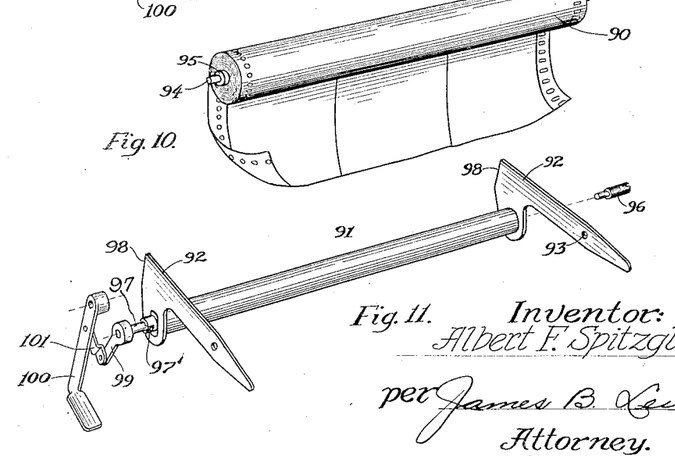
Figure 10 shows a chart roll such as used in the roll support of Figure 9.
Figure 11 is a detail in perspective showing the roll support and operating means therefor.

The record surface or paper on which the record is made is in the form of a sheet, a roll 90 of which is supported on a roll support, Figure 11, mounted in the end castings 25 and 26. This roll support comprises a shaft 91 to which are secured the resilient fingers 92 spaced apart a distance sufficient to accommodate the roll 90. The fingers are rigidly secured to the shaft 91 so as to turn therewith and are substantially L shaped with the shorter or base part of the L secured to the shaft 91 for a purpose hereinafter described. Each of the fingers is provided with an opening 93 for the reception of the bearing pins 94 of the spool 95 upon which the roll is wound and the fingers are adapted to be spread apart upon the removal or insertion of a roll as will be readily understood. Shaft 91 is supported in end casting 26 by means of a pin bearing 96 which is held in said casting and the other end of said shaft is detachably connected to a short shaft 97, by means of a coupling 97', which shaft is rotatably supported in end casting 25. This arrangement is such that the roll support can be readily removed, by retracting the pin bearing 96 and disengaging the coupling. This is important in the assemblying and servicing of the apparatus. Shaft 91 is preferably so mounted in the end castings that the heels 98 of the fingers abut against the rear of member 28, Figure 4, and thereby hold the roll support in normal operating position. While this form of mechanism is desirable it can be appreciated that the fingers may be shaped differently and stop pins or other means may be utilized to hold the roll support in operating position.

For swinging the roll support to its frontal position a crank 99 is secured to the end of short shaft 97, as shown in Figures 8, 9 and 11, and a lever 100 is conveniently pivotally mounted on end casting 25 and projects forward toward the front of the device, to a position for convenient operation. A link 101 pivotally connected at one end to the lever and likewise connected at its other end to the end of the crank serves to transmit the motion of the lever to the crank. The relative lengths of the lever, link and crank are so proportioned that a movement of the lever through about one fourth of a turn or 90 degrees causes the paper roll, supported in the fingers 92, to move upwardly and over through practically one half of a turn or 180 degrees to the position shown in Figures 9 and 10 where the roll may be conveniently and easily removed and/or replaced without interference with other parts of the device.

When it is desired to replace or inspect the chart roll the pen lifter is raised to the position illustrated in Figure 8 and the lever 100 pressed downwardly to the position shown in Figure 9, thus the chart roll is swung over into the position shown in Figure 8 where it may be conveniently inspected or replaced as the case may be. After the chart roll has been replaced the lever 100 is raised thereby causing the fingers to carry the chart roll to the position shown in Figure 4, which is its normal position. The pen lifter is then pressed to the left, as viewed from Figure 8, to free end piece 48 of the slot 54 after which it is lowered to its normal position, conveniently illustrated in Figure 4, and the device is then ready for operation.

The end casting 25 has mounted thereon a shield 102, as clearly shown in Figure 5, which is adapted, when the mechanism supporting frame 24 is closed, to conceal the leads 46 and thereby present a clean, clear-cut appearance of the interior of the casing. A shelf 103 carried by the shield is adapted to support a plurality of ink bottles 104 which contain ink for use in the recorder pens. The shelf is bent upwardly to form a side wall for retaining the bottles in place and the top of the wall is bent over to contact with the top of the bottle and is notched to receive the necks of the bottles to prevent accidental displacement thereof. The shelf provides a convenient depository for the ink bottles which are therefore always at hand when needed to replenish the ink in the pens.

The rear edge of wall 4 of the recorder casing is provided with a groove 105 and threaded bolt holes 106, are provided, preferably at the corners of the casing, for the cover retaining bolts. A felt strip 107 is placed in the groove and the recorder casing rear cover 108 is drawn tightly thereagainst by bolts 109 screwed into holes 106 to make a dust and moisture proof joint between the cover and casing.

When the front cover 7 and guide 12 are closed and the rear cover 108 is secured in place the recorder mechanism is housed in a substantially dust proof and moisture proof casing which excludes from said mechanism dust, grit, soot and moisture, any of which are harmful to accurate operation of the mechanism. The only opening to the interior of the casing is the opening in the bottom of the guide which is only large enough for the free passage of the chart and since this opening is below the recorder casing the possibility of foreign matter passing upwardly therethrough and through the guide is extremely remote and furthermore the accumulations of foreign matter that do collect in the guide can be conveniently removed when the guide is opened thereby further removing the possibility of such matter ever reaching the recording mechanism.

A guide 110, secured to the cover 108, serves to center the bolt 109 in the bolt hole 106 when the cover is placed in position and a pin 111 is passed through the bolt to one side of the bracket to prevent accidental loss of the bolt. Thus the bolt is always retained in place on the cover and when the cover is placed in position all that is necessary is to push the bolt inwardly and screw it down.

In accordance with the provisions of the patent statutes, I have described the principle of operation of my invention, together with the apparatus which I now consider to represent the best embodiment thereof, but I desire to have it understood that the apparatus shown is only illustrative and that the invention may be carried out by other means and that in some cases certain features of my invention may be used to advantage without a corresponding use of other features.

I do not intend to be limited to the precise details shown and described.

What I claim is:

1. In combination a panel, a strip chart recorder casing mounted on said panel with the front thereof substantially flush with the front of said panel, a door with a transparent portion therein for closing the front of said casing, said door being cut away at its bottom edge to allow the chart to pass from said casing, and a guide for the chart adapted to fit against said door adjacent said cut-away part and against the panel to provide therewith a housing for a portion of said chart.

2. In combination a panel, a strip chart recorder casing mounted on said panel substantially flush with the front of said panel, said casing having a door provided with a transparent portion, and being cut away at its bottom so that the chart passes therefrom and travels in close proximity to and parallel with the front of the panel, and a guide mounted on said panel for housing said chart, said guide provided with a transparent portion through which the chart may be observed but against which the chart does not contact.

3. In combination a panel, a casing provided with a transparent front cover, and mounted on said panel substantially flush with the front of said panel, a strip chart recorder mechanism mounted in said casing, the casing and door being cut away at adjacent points to provide a passage for the chart, said mechanism and passage being so relatively located that the chart passes from the casing in substantially a vertical plane and a guide for that portion of said chart which has passed from the casing.

4. In a multiple pen recorder mechanism, a frame comprising end members, and two instrument mounting plates connecting to said members, the second plate being mounted in rear of the front plate and spaced therefrom, a meter unit mounted on each plate and arranged in tandem with the pointers operating over the same chart area.

5. In a multiple pen recorder, an instrument supporting frame comprising end casting spaced apart and parallel, a tie plate connecting said castings and secured to the front thereof adjacent the top, a second plate secured at one end to the rear face of one casting and supported at the other end from the rear of the front plate and a third plate connected to said castings at the front lower portion thereof.

6. In a multiple pen recorder, the combination with a frame including front and back members of a plurality of meter units mounted on said members with front and back units arranged in pairs with the pen operating shafts of each pair co-axial.

7. In a multiple pen recorder the combination with a frame having spaced apart front and back instrument supporting members, of a plurality of recorder units mounted on each member and arranged in pairs, a front and back unit constituting a pair, with the pen operating shafts of each unit co-axial and means for transmitting the motion of the shaft of the rear unit forward so that the pens operated thereby turn about the same axis as that of the pens of the front unit.

8. In a multiple pen recording instrument, the combination with a frame having end castings interconnected by an instrument mounting plate carrying a plurality of meter units each provided with a recording pen, of a pen lifter including end members and a tie plate interconnecting said members, said end members being pivotally supported in the castings and said plate lying below said pens so that said pens will be raised when the lifter is raised, and means cooperating with one of said end members for releasably retaining said lifter in raised position.

9. In combination, a panel, a strip chart recorder mechanism mounted on said panel with the front thereof substantially flush with the face of said panel and provided with an opening in front of the panel for the chart issuing from the recorder, and a guide supported on said panel and providing a housing for that portion of the chart which has passed from the casing.

10. In combination, a support, a strip chart recorder casing mounted on said support with the front thereof substantially flush with the front of said support and provided with an opening in front of said support thru which the record strip passes, a rectangular guide pivoted to said support and cooperating with said recorder casing and support to provide an enclosed passageway for that portion of the chart which has passed from the casing.

11. In combination, a support, a strip chart recorder casing mounted on said support with a front thereof substantially flush with the front of said support and provided with an opening for the passage of the strip chart and a rectangular shaped guide pivoted at its lower end to said support and cooperating at its upper end and sides with said casing and support respectively to provide a protected passageway for the chart issuing from said opening, said panel provided with a transparent front portion through which the chart may be viewed and spaced away from the support at its lower end to provide a passageway for the chart.

12. In combination, a panel, a casing provided with a transparent cover, said casing mounted on said panel substantially flush with the front of said panel, a strip chart recorder mechanism mounted within said casing in such manner that the chart issuing from said casing travels in close proximity and parallel to said panel, and a guide pivotally supported at its lower end on said panel and cooperating with the panel and the casing to provide a passageway for the chart as it travels downwardly along said panel, said guide provided with a transparent portion thru which the chart may be viewed and cut away at its lower end to provide an exit passage for the chart.

13. In a multiple index instrument, the combination with a frame, of a plurality of meter operated shafts mounted on said frame, said shafts being arranged in pairs with one shaft of each pair mounted in rear of the other.

14. In a multiple index instrument, a frame having spaced apart instruments supporting members, a plurality of instruments one mounted on each member and arranged in pairs with one in rear of the other, pens operated by each instrument and means for supporting said pens from said instruments, so that the pens turn about substantially the same pivotal axis.

15. In a multiple pen recorder, a frame, a plurality of pen operating shafts mounted in tandem on said frame, pens operated by each shaft and means from said shafts for supporting said pens to turn about substantially the same pivotal axis and actuating instrumentalities for operating each shaft.

16. In a multiple pen recorder, a frame, a pair of pen operating shafts mounted in tandem on said frame, a pen pivotally supported by said front shaft, a forwardly extending arm carried by said rear shaft and a pen pivotally supported from said arm to pivot about the same axis of motion as that of the front pen.

17. In a recorder of the type described, a frame, pen operated shafts supported on said frame in rear of each other, a pen carried by the front shaft and an arm carried by the rear shaft extending forwardly substantially parallel with the front shaft and a pen mounted on said arm to turn about the same pivotal axis as that of the front pen.

18. In an instrument of the type described, a support, an instrument pivotally mounted on said support, said instrument provided with an index operating shaft substantially coaxial with the pivotal mounting of the instrument and adjustable means whereby the instrument may be adjusted axially of its support to correct the position of the index.

19. In an instrument of the type described, a supporting plate, an index operating shaft, mounting means for said shaft pivotally supported to said plate, said pivot and shaft co-axially aligned, and means for holding said support in adjusted position.

20. A device of the class described comprising, in combination, a support having an aperture, a recorder casing about said aperture and provided with an opening in front of said support thru which the chart passes, and a guide, comprising a frame and a transparent pane, hinged on said support and adapted to cooperate with said casing and support to provide a dust proof housing for the chart and to swing away from said support when desired to give access to the chart.

21. A device of the class described comprising, in combination, a support having an aperture, a frame in said aperture having a bezel extending over the face of the support and secured thereto, a door with a transparent portion on said bezel, said door and bezel being cut away at the bottom to provide an exit opening and a guide, comprising a frame cut away at its bottom and a transparent pane, hinged at its bottom to said support and adapted to close against said support along its sides and the frame and door at its top to enclose and form an extension of said exit opening.

In testimony whereof I affix my signature.

ALBERT F. SPITZGLASS.